United States Patent [19]
Kneier

[11] 3,985,409
[45] Oct. 12, 1976

[54] TACKLE BOX

[75] Inventor: Joseph W. Kneier, Chesterland, Ohio

[73] Assignee: Ingersoll-Rand Company, Woodcliff Lake, N.J.

[22] Filed: Aug. 13, 1975

[21] Appl. No.: 604,170

[52] U.S. Cl. ................................ 312/271; 312/266; 312/269; 312/DIG. 33
[51] Int. Cl.² ................... A47B 51/00; A47B 81/00
[58] Field of Search ............ 312/271, 201, DIG. 33, 312/DIG. 32, 244, 266, 269

[56] References Cited
UNITED STATES PATENTS

| 993,469 | 5/1911 | Stocker | 312/269 |
|---|---|---|---|
| 1,652,984 | 12/1927 | Hixson | 312/269 |
| 1,882,756 | 10/1932 | Boynton | 312/DIG. 33 |
| 2,755,154 | 7/1956 | Mele | 312/269 |
| 2,895,600 | 7/1959 | Nevins | 312/DIG. 33 |
| 2,983,367 | 5/1961 | Parmater et al. | 312/DIG. 33 |
| 3,155,231 | 11/1964 | Vinas | 312/201 |
| 3,301,619 | 1/1967 | Mead | 312/244 |
| 3,353,886 | 11/1967 | Tompkins | 312/244 |
| 3,606,511 | 9/1971 | Henning et al. | 312/266 |
| 3,612,635 | 10/1971 | Uyeda | 312/269 |

FOREIGN PATENTS OR APPLICATIONS

1,026,684  3/1958  Germany .................. 312/DIG. 33

*Primary Examiner*—Paul R. Gilliam
*Assistant Examiner*—Victor N. Sakran
*Attorney, Agent, or Firm*—Walter C. Vliet

[57] ABSTRACT

A tackle box is disclosed which includes a plurality of storage drawers guidingly supporting for selective, horizontal, and vertical movement by support means which are cantilevered to expose the drawer assembly when the tackle box is open. In addition, the tackle box is provided with a drop front panel which allows access to the storage drawers when the tackle box is in its essentially closed position and more convenient access to the bottom of the tackle box when the box is open.

7 Claims, 5 Drawing Figures

TACKLE BOX

BACKGROUND OF THE INVENTION

The construction of tackle boxes varies widely. However, they are basically designed to accomplish the storage of numerous items of varying size and shape in a convenient and orderly manner which provides maximum access to the items contained. In addition, tackle boxes are normally designed to be portable and operative in relatively confined spaces. The construction of the tackle box should be relatively simple, jam-proof, stable, and provide a maximum of protection to the tackle box content. These requirements are generally similar to those of tool boxes and the same containers are often utilized interchangeably for that purpose. One of the most popular forms of tackle box utilizes cantilevered storage compartment, which swing open or must be swung open each time access to the contents of the compartments are required. In their opened condition, they are often unstable and require a greater area for placement. Tackle boxes are also constructed with slidable storage drawers. These boxes require less free space and more stable. However, the user cannot have simultaneous access to all the contents of the box and because of the nature of the drawer contents, the drawers become readily jammed. Struggling to unjam these drawers can be a frustrating experience and the source of possible injury to the user because of the nature of the contents. A number of tackle boxes have been constructed that utilizes trays which are removable. However, as each tray is removed, it requires an area to be set. This can also be a cumbersome when only one hand is available for the operation as often the case. In addition, in their opened condition, they afford little protection to the contents.

SUMMARY OF THE INVENTION

In accordance with the present invention, a tackle box is provided with a plurality of storage drawers which presents numerous options to the user. The storage drawers are supported by a combination of means which allows the drawers to be cantilevered as a unit to expose the lower storage compartment in the tackle box or alternatively operate as a chest of drawers with an unstacking feature which allows full and individual access to each of the drawers if desired or for the purpose of unjamming the drawers. In addition, the tackle box features a box top which is cut away at the front to allow greater visibility and access to the cantilevered storage drawers. The box also features a drop front panel which allows access to the storage drawers so that they may be individually extended horizontally to provide access thereto without the need for fully opening the tackle box. Cantilevering of the storage drawers is accomplished by a minimum of mechanism and without the need for opening or rotating the tackle box top through more than 90 degrees thus providing a more stable box in the fully opened position. The top, the bottom, and the drop front panel cooperate to enclose the contents of the tackle box to protect them from air-borned water such as rain or spray. Other features and advantages of the invention will be apparent from the following description and claims and are illustrated in the accompanying drawings which show the structure of the preferred embodiment of this invention. In general, the object of this invention is to provide a tackle box with a drawer assembly comprising a plurality of drawer trays disposed for vertical support on horizontal guide means; said horizontal guide means being disposed in vertical guide means in stacking relationship such that the drawer trays may be independently extended horizontally for a first means of access and lifted vertically with the horizontal guide means individually or in any combination as a second means of access.

BRIEF DESCRIPTION OF THE DRAWINGS

The accompanying drawings forming part of this specification are numbered and employ like numerals to designate like parts throughout the same.

DESCRIPTION OF THE PREFERRED EMBODIMENT

Figure 1:
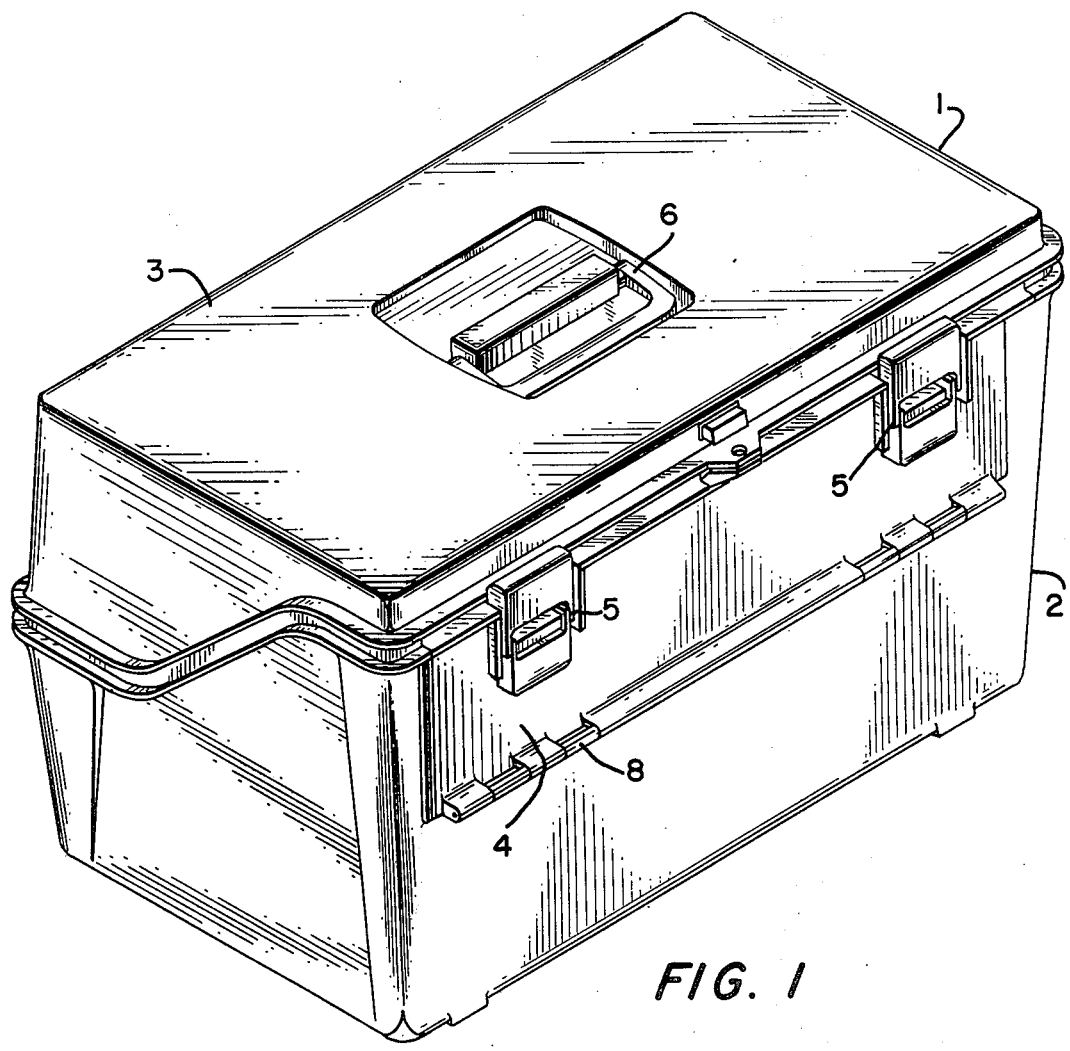
FIG. 1 is a perspective view of the tackle box in its closed position.
Figure 2:
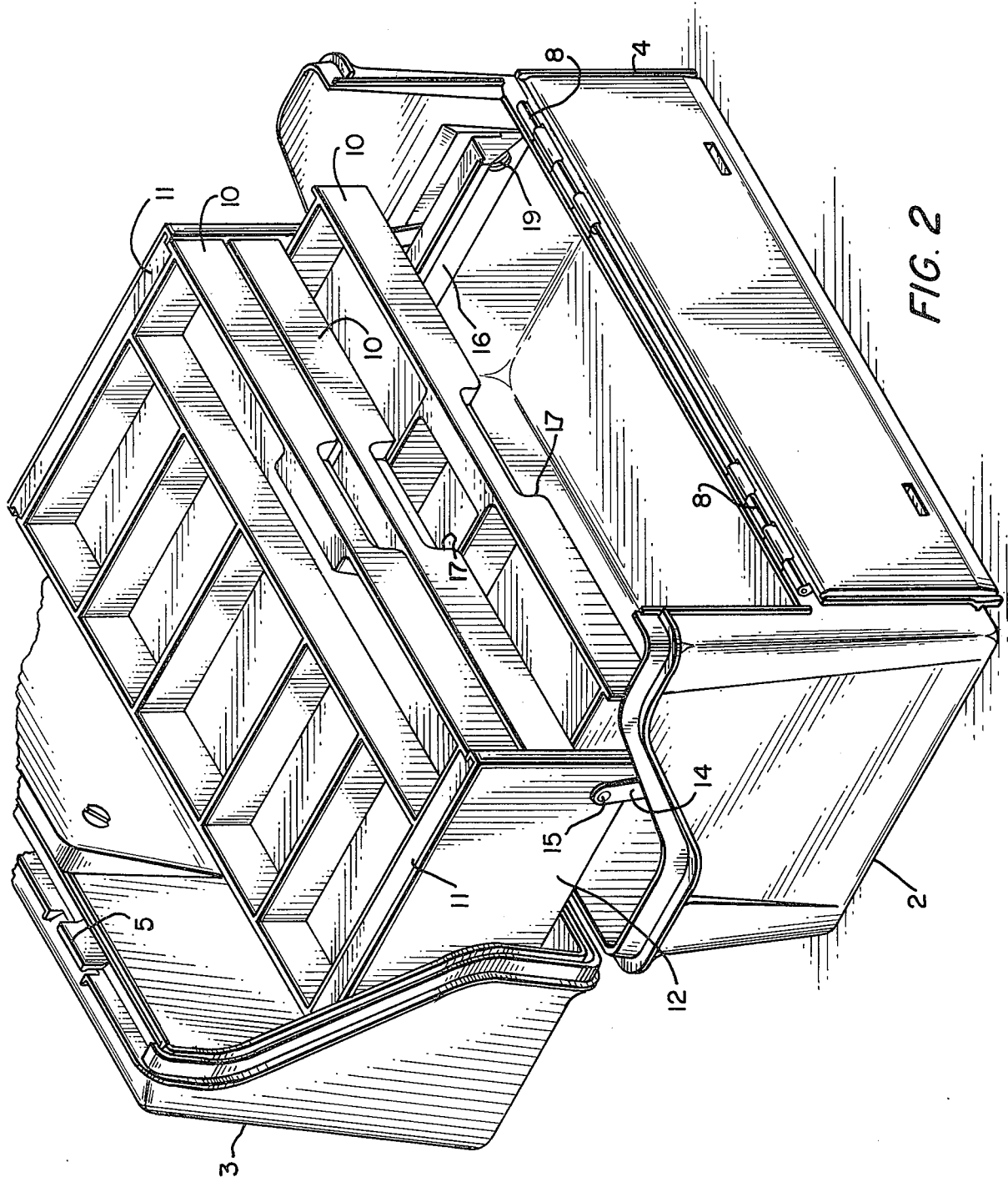
FIG. 2 is a perspective view of the tackle box in its opened position showing the storage drawers cantilevered above and to the rear of the lower storage compartment and having the drop front panel in its lowered position.
Figure 4:
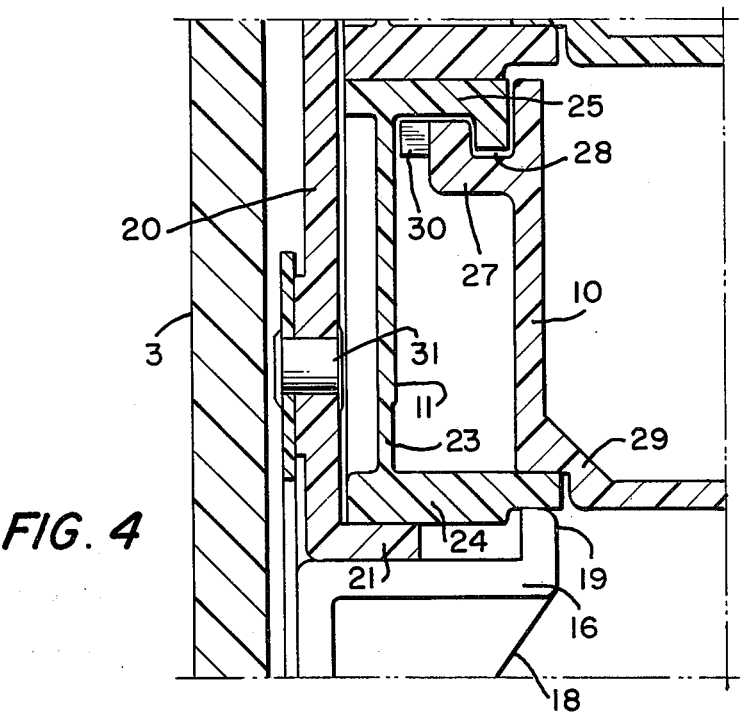
FIG. 4 is a front elevated sectional view of the combination drawer support means showing the details of construction.
Figure 3:
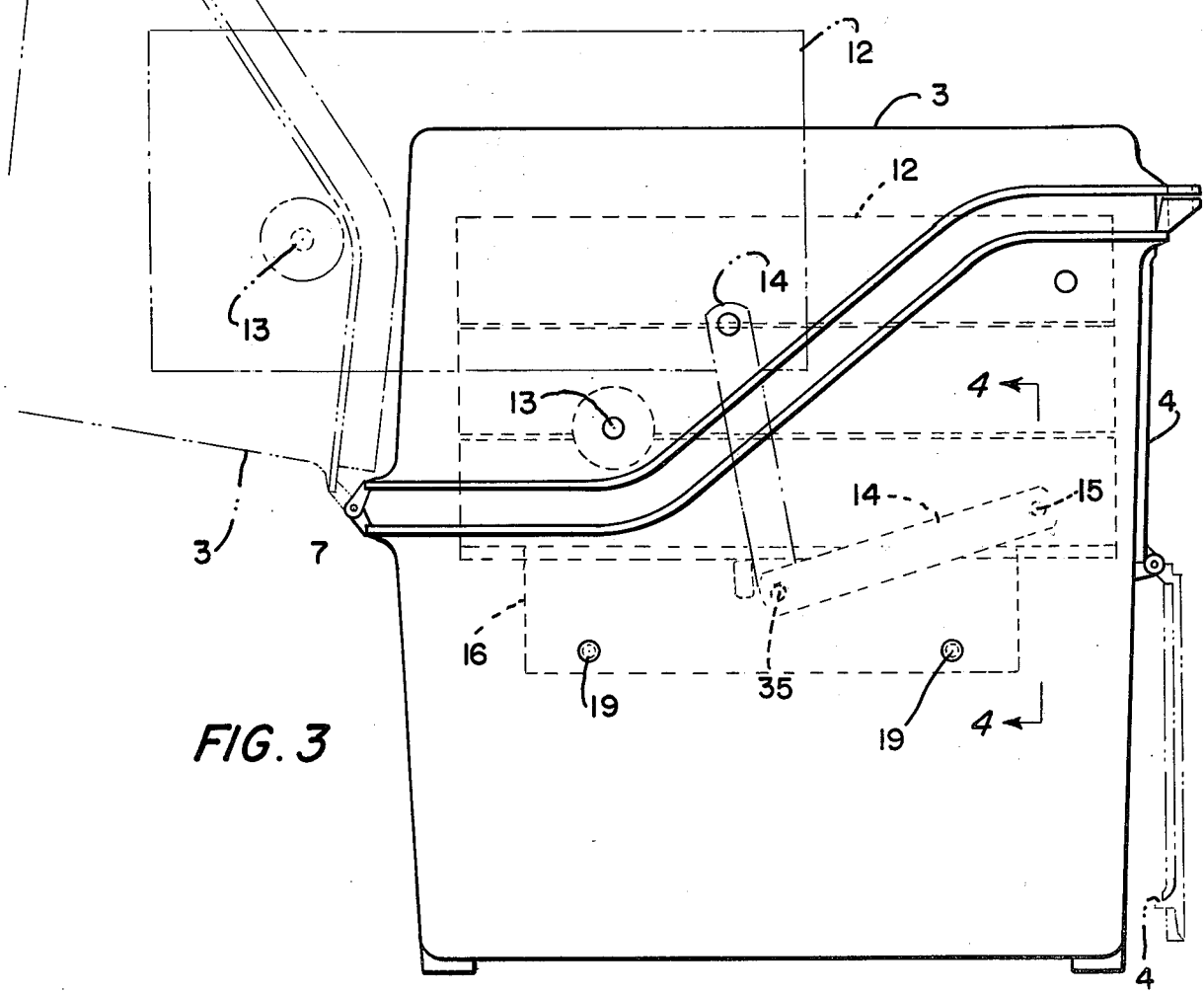
FIG. 3 is a side elevation view showing the tackle box in its closed position with the storage drawers in their position internal to the box. Ghost lines indicate the relative position of the tackle box top storage drawers and drop front in its opened position.

Referring now to the drawings: FIG. 1 shows a tackle box 1 constructed to house the present invention, the tackle box is provided with a bottom section 2, a top section 3, a drop front panel 4, a latch assembly 5, and a handle 6. FIG. 2 shows the tackle box 1 in its opened position having both the top portion 3 rotated about hinge assembly 7 (shown on FIG. 3) and top front panel 4 rotated approximately 180 degrees from its closed position about panel hinges 8. This exposes to view and access both the lower interior portion of the bottom section and the storage drawer assembly 9. The individual drawers 10 are shown having various individual compartments for containing fishing tackle and the like. The storage drawers are shown supported by horizontal guide means 11 which are in turn supported in vertical guide means 12. The vertical guide means 12 are supported by means of a pivot means 13 (shown on FIG. 3) and cantilever links 14. The cantilever links 14 have one end attached to the vertical guide means by means of a pivot pin 15 and the other end is attached to tray rest 16 by means of a pivot pin 35. The drawers are provided with convenient hand pull recesses 17. The hand pull recesses allow easy gripping of the storage drawers for both horizontal extension of the drawers as shown by the bottom drawer on FIG. 2 and vertical extension of the drawers as shown by the top drawer on FIG. 5. FIG. 3 shows the relative positions of the various major components of the tackle box in the closed position (solid lines with the interior portion shown as dashed lines). In addition, ghost lines are utilized to show the tackle box in its opened position. FIG. 4 shows the details of construction of the storage drawer assembly in sectional view including a portion of the top 3, the tray rest 16, the cantilever links 14, the pivot pin 31, the vertical guide means 12, the horizontal guide means 11, and the drawer 10. As can be seen in FIG. 4, the tray rest is generally a Z section having strengthening gussets 18 and a support lip 19. The tray rest is attached to the sides of the box bottom by means of rivets 19 (shown on FIG. 3). The vertical guide means 12 is shown having a vertical wall portion 20 and a bottom horizontal projection 21. In addition, the vertical guide means is provided with a U-shaped lip 22 on both its forward and rear edge (shown on FIG. 5). Also shown on the FIG. 4 is horizontal guide means 11 which has a generally C-shaped section comprising a vertical webb 23, the bottom horizontal drawer support 24, and a top interlocking section 25. The horizontal guide means is also provided with a vertical boss 26 at both its front and rear end which cooperates with the U-shaped lip 22 as shown on FIG. 5. The horizontal guide means is also provided with a vertical guide stop 32 at both its front and rear end. Drawer 10 shown on FIG. 4 is of conventional form except that it is provided with interlocking lip 27 which forms a U-shaped channel 28 with the vertical wall of drawer 10 and cooperates with the top interlocking section 25 of horizontal guide means 11 to secure the drawer from side-to-side horizontal movement and vertical movement. Drawer 10 is also provided with guide notch 29 which supports the drawer vertically and cooperates with the U-shaped channel 28 to prevent horizontal sideways movement of the wall. Attached to interlocking lip 27 is a stop boss 30. The stop boss 30 extends a sufficient distance from interlocking lip 27 to intercept vertical guide stop 32 when the drawer 10 is substantially extended. This prevents the drawer from accidentally extending beyond the horizontal guide means 11.

Figure 5:
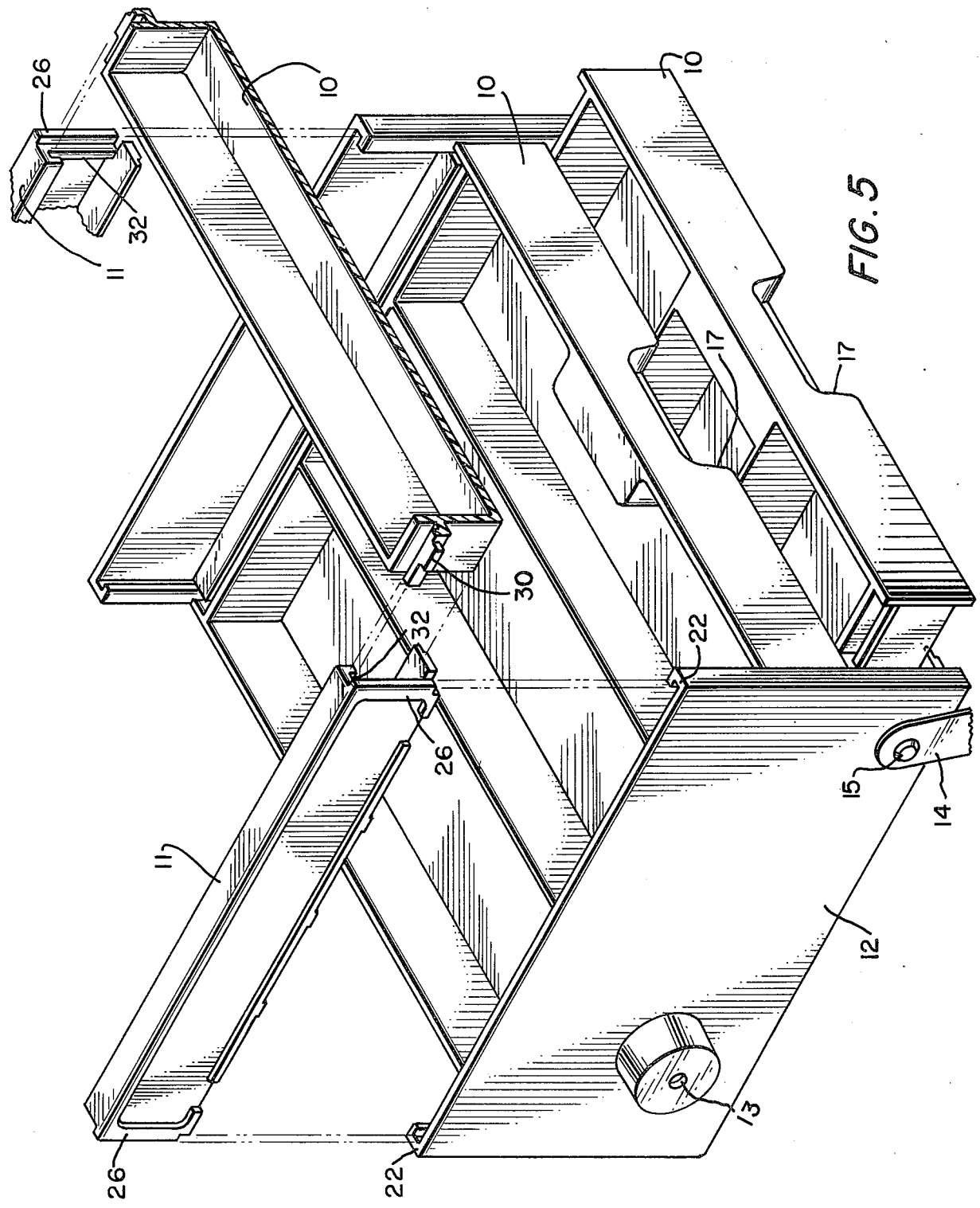
FIG. 5 is a exploded side perspective view of the storage drawer assembly showing the details of the support means and principle operation.

Having identified and described the various components of the tackle box and referring to FIG. 5, it should be obvious to one skilled in the art of tackle or tool box manufacture that applicant's invention provides an assembly of drawers which may be contained within a tackle box in its closed position. By means of a carefully selected pivot point and cantilever link, the storage drawer assembly may be lifted and exposed for access when the tackle box top is opened. It should also be obvious that the unique construction of the tackle box assembly provides a workable structure of interlocked individual parts which may be operated in a desirable fashion to individually and selectively open the drawers by sliding them horizontally toward the front of the tackle box. In addition, should the contents of the drawer prevent the drawer from opening, the drawers may be removed from the assembly stack by lifting them vertically. It should be obvious that the drawers may move independently when they are extended horizontally. However, when they are lifted vertically, they carry with them the horizontal guide means. Once the drawer and horizontal guide means has been lifted clear of the vertical guide means the horizontal guide means may be removed from the drawer by rotating the bottom of the horizontal guide means out away from the bottom of the drawer and lifting the horizontal guide means up relative to the drawer. Sufficient clearance is provided in the U-shaped channel 28 to accomplish this. It should also be obvious that the interlocking nature of the drawer assembly prevents the vertical guide means from moving relative to one another in a direction perpendicular to the face of each of the vertical guide means. Thus, when the drawers are assembled, a relatively rigid drawer structure exists. It should be obvious to one skilled in the art that the materials of construction may be varied, a plastic material being utilized in applicant's preferred embodiment. Wood or metal construction would also be suitable. It is also possible to vary the details of construction within the scope of the claims without departing from the spirit of the invention as the same will now be understood.

I claim:

1. A tackle box assembly comprising:

a plurality of drawer trays disposed for vertical support on horizontal guide means;

said horizontal guide means being disposed in vertical guide means in stacking relationship such that the drawer trays may be independently extended horizontally for a first means of access and lifted vertically with the horizontal guide means in any combination as a second means of access;

said vertical guide means being disposed within a box-like container means;

said container means has at least a top and a bottom section for containing said drawer assembly;

said top section is movable from a first position whereby it forms a closed container in cooperation with said bottom section, to a second position whereby said container is open; and said vertical guide means is attached by pivot means to said top section and by cantilever link means to said bottom section thereby said drawer assembly is moved to a position within said container when said top section is moved to said first position and to a position above and towards the rear of said bottom section when said top section is moved to said second position to provide access to both said drawer assembly and said bottom section.

2. The tackle box assembly of claim 1 wherein:

said vertical guide means is comprised of a pair of spaced apart vertical wall members having a bottom horizontal projection for support of said horizontal guide means and a U-shaped lip at the front and rear edge of said wall member to guidingly restrain said horizontal guide means.

3. The tackle box assembly of claim 1 wherein:

said horizontal guide means is comprised of a horizontally extending member having a generally flattened C-shaped cross section and a vertical boss at each end which cooperates with said horizontal guide means to provide horizontal restraint for said horizontal guide means.

4. The tackle box assembly of claim 1 wherein:

said bottom section has a front wall section of greater depth than at the back;

said top section has a back wall section of greater depth than at the front; and said bottom front wall section is provided with a movable front panel for purpose of providing access to said drawer trays when said top section is essentially in its closed position thereby allowing said drawer tray to be individually extended horizontally in the nature of a drawer.

5. The tackle box assembly of claim 2 wherein:

each of said drawer tray comprises an open top box having a plurality of partitions therein to provide storage of tackle; and said drawer tray is provided with an interlocking lip on each side which cooperates with said horizontal guide means to restrain both horizontal movement perpendicular to said horizontal guide means and vertical movement relative to said horizontal guide means while allowing said drawer tray to be extended horizontally parallel to said horizontal guide means.

6. The tackle box assembly of claim 5 wherein:
said drawer tray is provided with a stop boss which cooperates with said U-shaped lip to limit the horizontal extension of said drawer tray parallel to said horizontal guide means when said drawer tray is disposed on said horizontal guide means and said horizontal guide means is disposed in said vertical guide means.

7. The tackle box assembly of claim 4 wherein:
said movable front panel is hingedly connected at its lower edge to said bottom section; and said front panel is provided with a plurality of latch assembly at its upper edge whereby when said top section is in its second position and said front panel is in its closed position said latch assembly cooperates with said top section to secure said container in a closed position.

* * * * *